United States Patent
Sato et al.

[11] Patent Number: 6,059,187
[45] Date of Patent: *May 9, 2000

[54] APPARATUS FOR AND METHOD OF DETECTING BAR CODE

[75] Inventors: Shinichi Sato; Mitsuo Watanabe; Isao Iwaguchi; Ichiro Shinoda, all of Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/628,109

[22] Filed: Apr. 9, 1996

[30] Foreign Application Priority Data

Aug. 10, 1995 [JP] Japan .................................. 7-204933

[51] Int. Cl.⁷ ...................................................... G06K 7/10
[52] U.S. Cl. ................................ 235/462.16; 235/462.18
[58] Field of Search .................................... 235/462, 463, 235/462.16, 462.18, 462.19

[56] References Cited

U.S. PATENT DOCUMENTS

| | | | |
|---|---|---|---|
| 3,882,464 | 5/1975 | Zamkow | 235/463 |
| 4,533,825 | 8/1985 | Yamada | 235/463 |
| 4,667,089 | 5/1987 | Shirakabe et al. | 235/463 |
| 4,717,818 | 1/1988 | Broockman et al. | 235/463 |
| 4,859,840 | 8/1989 | Hasegawa et al. | 235/463 |
| 5,077,463 | 12/1991 | Sato | 235/463 |
| 5,196,685 | 3/1993 | Izumi | 235/463 |
| 5,414,252 | 5/1995 | Shinoda et al. | 235/463 |
| 5,442,164 | 8/1995 | Adachi | 235/463 |
| 5,504,315 | 4/1996 | Hardesty et al. | 235/462 |

FOREIGN PATENT DOCUMENTS 57-6977  1/1982  Japan .

OTHER PUBLICATIONS

Roger C. Palmer, *The Bar Code Book*, Helmers Publishing Inc., 1995, pp. 289–297.

Craig K. Harmon, *Lines of Communication*, Helmers Publishing Inc., 1994, pp. 15–24.

*Primary Examiner*—Donald Hajec
*Assistant Examiner*—Mark Tremblay
*Attorney, Agent, or Firm*—Arent, Fox Kintner Plotkin & Kahn

[57] ABSTRACT

Bar with count values indicating widths of white and black bars, which are reciprocally obtained, are input to buffers connected in series at 16 stages. The bar width count values written to those buffers are sequentially shifted each time a new bar width count value is input. A comparing circuit compares the widths of the adjacent bars in the same color with each other and checks whether or not a ratio therebetween falls within a range of 0.2–5.0 times as large as each other. Results of the comparisons by this comparing circuit are written to result registers connected in series at 13 stages. The check-results written to those result registers are sequentially shifted each time a new bar width count value is input. Accordingly, if all the check results written to all the result registers indicate an "in-range" state, it follows that the fifteen or more bars consecutively meet a bar code condition. Hence, the counter lets an AND gate open. If even one of the check results written to the result registers indicates an "out-of-range" state, the counter starts counting. Then, when a count result reaches 17, the counter lets the AND gate close. Therefore, just when one of the check results written to the result registers is in the "out-of-range" state, the bar width count value written to each buffer is output. The bar width count values input thereafter are disposed of.

8 Claims, 10 Drawing Sheets

APPARATUS FOR AND METHOD OF DETECTING BAR CODE

BACKGROUND OF THE INVENTION

1. Field of the Invention

The present invention relates generally to a bar code detecting apparatus for and a bar code detecting method of detecting a variation in intensity of reflected light from a bar code, thereby reading the bar code and demodulating it into data. The present invention relates more particularly to a bar code detecting apparatus and a bar code detecting method that are capable of efficiently demodulating the bar code by logically eliminating data for intensity variation of reflected light which is generated due to elements other than the bar code.

2. Description of the Prior Art

In recent years, as represented by a POS system in the field of distributing business, etc., it is a common practice that commodities are managed based on bar codes. For example, in the POS system for commodities, data such as kinds, selling prices, etc. of the commodities are coded in a bar code format, and the encoded bar code is printed on the commodity or printed on a seal labeled to the commodity. Then, the bar codes are read at a checkout counter, and money is paid based on the read data. Then, the numbers of commodities sold are summed in real time, which serves for managing the stock and purchasing as well.

A bar code reader for reading such bar codes is roughly classified into a fixed type, employed for small comodities, and a handy or portable type employed for large commodities. The fixed type of bar code reader involves the use of a mechanism for scanning the bar code with irradiated reading light beams In multi-directions so that the bar code can be read even when the commodity is set over the bar code reader without an operator being aware of a direction of the bar code. More specifically, the fixed type uses a polygon mirror and fixed reflecting mirrors in combination. Then, the laser beams as the reading light beams are reflected by a single reflecting surface of the polygon mirror, during which the reflected light beams therefrom successively strike on a plurality of fixed reflecting mirrors in order and turned for scanning in a variety of directions by the respective fixed reflecting mirrors. This fixed type of bar code reader receives the reflected light beams from the surface of the commodity while performing the scan described above and inputs an item of intensity variation data of the reflected light beam received (hereinafter termed "reflected light data") to a demodulating circuit. This demodulating circuit demodulates the reflected light data on the basis of a bar code demodulation algorithm and extracts the data coded in the bar code format.

Such a fixed type of bar code reader is demanded for a higher performance when quickly reading the bar codes. For this purpose, there has hitherto been made an attempt to increase a probability (a bar code scanning probability) (at which the laser beams hit at the bar code of the commodity passing above the bar code reader) by increasing a laser scan velocity with high-speed rotations of the polygon mirror.

However, when such a high-speed scan is carried out, though the bar code scanning probability per unit time is enhanced, a whole quantity of the reflected light data per unit time increases because of the bar code scanning probability being fixed during a period of one revolution of the polygon mirror. The demodulating circuit has to demodulate all pieces of reflected light data augmented as described above, and, therefore, the high-speed scanning leads to a futile increase in processing load for the demodulating circuit and a rise in costs due to an arisen necessity for a scale-up (i.e., upgrading) of the hardware.

Further, in response to the demand for higher-performance for the bar code reader, there has been conducted such a complex demodulating process as to reproduce the data corresponding to the whole single bar code by connecting fragmented pieces of reflected light data based on the bar code (hereinafter referred to as "bar code reflected light data"). The above complex demodulating process, however, causes an increase in the processing load of the demodulating circuit. Accordingly, if such a demodulating process is executed for the reflected light data relative to the elements exclusive of the bar code, this leads to a futile rise in the processing load for the demodulating circuit.

SUMMARY OF THE INVENTION

It is a primary object of the present invention to provide a bar code detecting apparatus and a bar code detecting method that are capable of a) increasing a containing rate of bar code reflected light data in reflected light data by logically eliminating data obviously relative to elements other than a bar code among pieces of reflected light data before inputting the reflected light data to a demodulating circuit and b) enhancing a processing efficiency of the demodulating circuit.

To accomplish the above object, according to the present invention, a code detecting apparatus comprises a bright/dark pattern detecting unit for scanning an object surface and detecting a bright/dark pattern on the object surface along a scan trajectory. A numerical value converting unit is for sequentially converting widths of the bright and dark portions of the bright/dark pattern detected by the bright/dark pattern detecting unit into numerical values. The apparatus further comprises a determining unit, to which the respective numerical values converted by the numerical converting unit are sequentially input for determining whether or not each input numerical value meets a predetermined bar code standard condition with respect to the numerical value input just before it. An extracting unit is for extracting the numerical value so determined by the determining unit as to meet the predetermined bar code standard condition and a data demodulating unit is for demodulating the data on the basis of the numerical value extracted by the extracting unit.

The bright/dark pattern detecting unit may optically read the bright/dark pattern. The bright/dark pattern detecting unit may scan by use of irradiation light beams emitted from a light emitting unit or may scan a light receiving unit. The bright/dark pattern detecting unit, if constructed to scan by use of the irradiation light beams emitted from the light emitting unit, may include a light irradiating unit for irradiating the object surface with scanning light beams, a photoelectricaly converting unit for photoelectrically converting the reflected light beams from the object surface and a signal converting unit for converting an electric signal obtained by the photoelectrically converting unit into a signal assuming a first signal status showing the bright portion and a second signal status showing the dark portion. Further, the bright/dark pattern detecting unit may be arranged as a portable type of which the light emitting unit and light receiving unit are scanned manually by hand.

A conversion rate between a width and a numerical value in the numerical value converting unit may be arbitrary based on a condition that the conversion rate is substantially fixed.

A bar code standard condition serving as a determining condition of the determining unit is a standard condition prescribed by a JAN (Japan Article Number) code, a UPC code, an EAN code, an ITF (Interleaved Two of Five) and so on and indicates that the input numerical value falls within a range of a maximum ratio of the mutual bars constituting the bar code. Take the JAN code for example, it is possible to use such a condition that the maximum bar-to-bar ratio is 1:4, and hence the input numerical value falls within a range of 0.2–5.0 times as large as a numerical value input just before it. If over this range, it is obvious that the input numerical value does not correspond to one of the bars constituting the bar code.

The determining unit may compare each input numerical value with the numerical value input just before it irrespective of a distinction between the bright and dark portions. Otherwise, the bright portions may be compared with each other, and the dark portions may be compared with each other. In the latter case, the determining unit determines whether or not the input numerical value, if it is a numerical value of the bright portion, satisfies the predetermined bar code standard condition with respect to the bright portion numerical value input just before it and determines whether or not the input numerical value, if it is a numerical value of the dark portion, satisfies the predetermined bar code standard condition with respect to the dark portion numerical value input just before it.

The extracting unit may be constructed to extract numerical values which are determined or referred to in a plurality of determinations only when the determination, that each input numerical value meets the predetermined bar code standard condition with respect to the numerical value input just before it, is continuously made a predetermined plurality of times by the determining unit. If determined once, a probability of meeting the condition by chance is high. If the condition is continuously satisfied a plurality of times, however, the by-chance probability decreases, whereas the probability of being the numerical value based on the bar code increases. In this case, the determination can be consecutively effected 15 times. Further, the extracting unit may also extract numerical values just before and after the numerical values which are determined or referred to in the plurality of determinations. It is because such values have a high possibility that these values are based on margins added to the head and tail of the bar code. Further, the extracting unit may add flags, indicating a discontinuity of the data, to the numerical values just after the numerical values which are determined or referred to in the plurality of determinations. With this arrangement, the demodulating unit is capable of recognizing a discontinuity position of the data and therefore delimiting the demodulating process in this discontinuity position. As a result, a demodulating error can be prevented.

According to the present invention, a bar code detecting method comprises a step of scanning an object surface and a step of detecting a bright/dark pattern on the object surface along a scan trajectory. This method further comprises a step of sequentially converting widths of the bright and dark portions of the bright/dark pattern detected into numerical values, a step of determining whether or not the converted numerical value meets a predetermined bar code standard condition with respect to the numerical value converted just before it, a step of extracting the former converted numerical value, if the converted numerical value satisfies the predetermined bar code standard condition with respect to the numerical value converted just before it and a step of demodulating the data on the basis of the extracted numerical value.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Embodiments of the present invention will hereinafter be discussed with reference to the accompanying drawings.

First Embodiment

Principle of Embodiment

Figure 1:
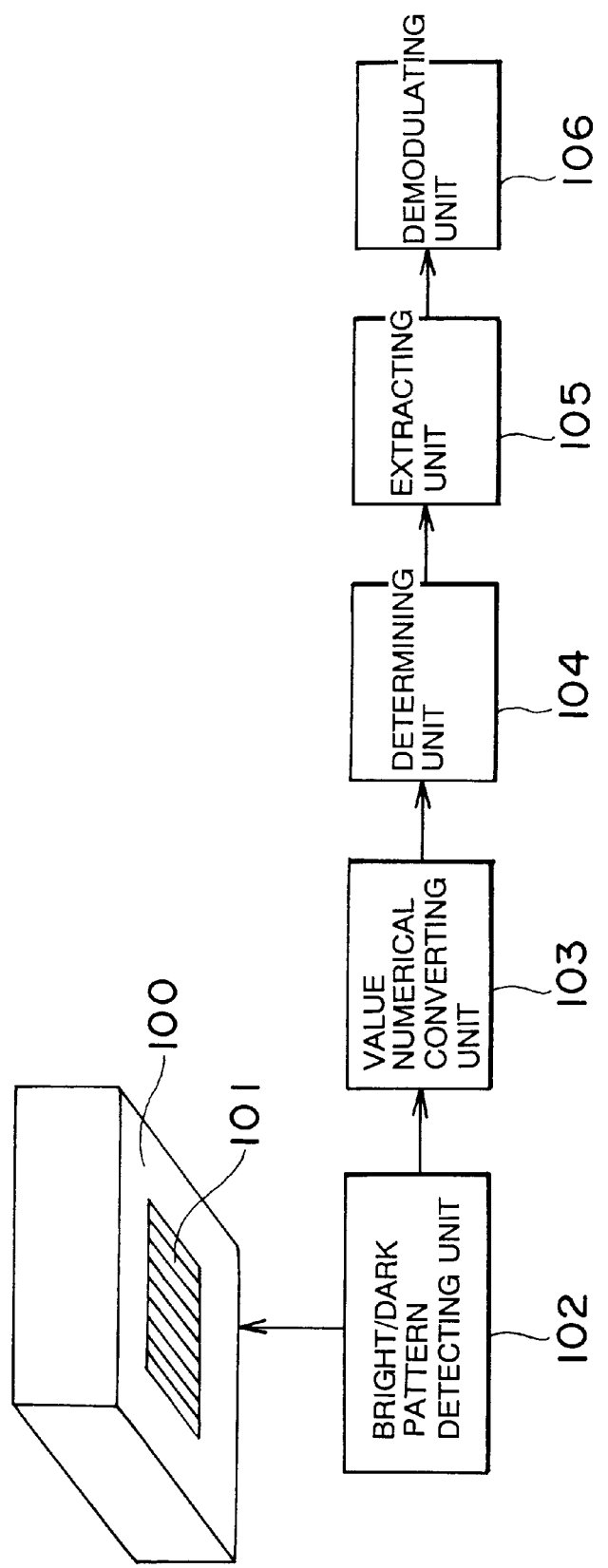
FIG. 1 is a principle diagram showing a principle of a first embodiment of the present invention.

FIG. 1 is a schematic diagram showing a principle of a bar code detecting apparatus in a first embodiment of the present invention. Referring to FIG. 1, a bright/dark pattern detecting unit 102 scans an object surface 100 formed with a bar code 101 and detects a bright/dark pattern formed on the object surface 101 along a scanning trajectory. A numerical value converting unit 103 sequentially converts widths of respective bright portions and dark portions which constitutes the bright/dark pattern detected by the bright/dark pattern detecting unit 102 into numerical values. A determining unit 104 sequentially receives the respective numerical values converted by the numerical value converting unit 103 and determines whether or not the received numerical value meets a predetermined bar code standard condition with respect to the numerical value input just anterior thereto. An extracting unit 105 extracts only the numerical value, so determined by the determining unit 104, when it satisfies the predetermined bar code standard condition. Accordingly, the numerical values having no such possibility as to be attributed to the bars constituting the bar code are eliminated, while only the numerical values having such a possibility as to be attributed to the bars constituting the bar code can be transferred to a data demodulating unit 106 of a next stage. A data demodulating-unit 106 demodulates data on the basis of the above numerical value extracted by the extracting unit 105. Hence, an efficiency of the demodulating process by this demodulating unit 106 is enhanced.

Whole Construction of Bar Code Detecting Apparatus

Figure 2:
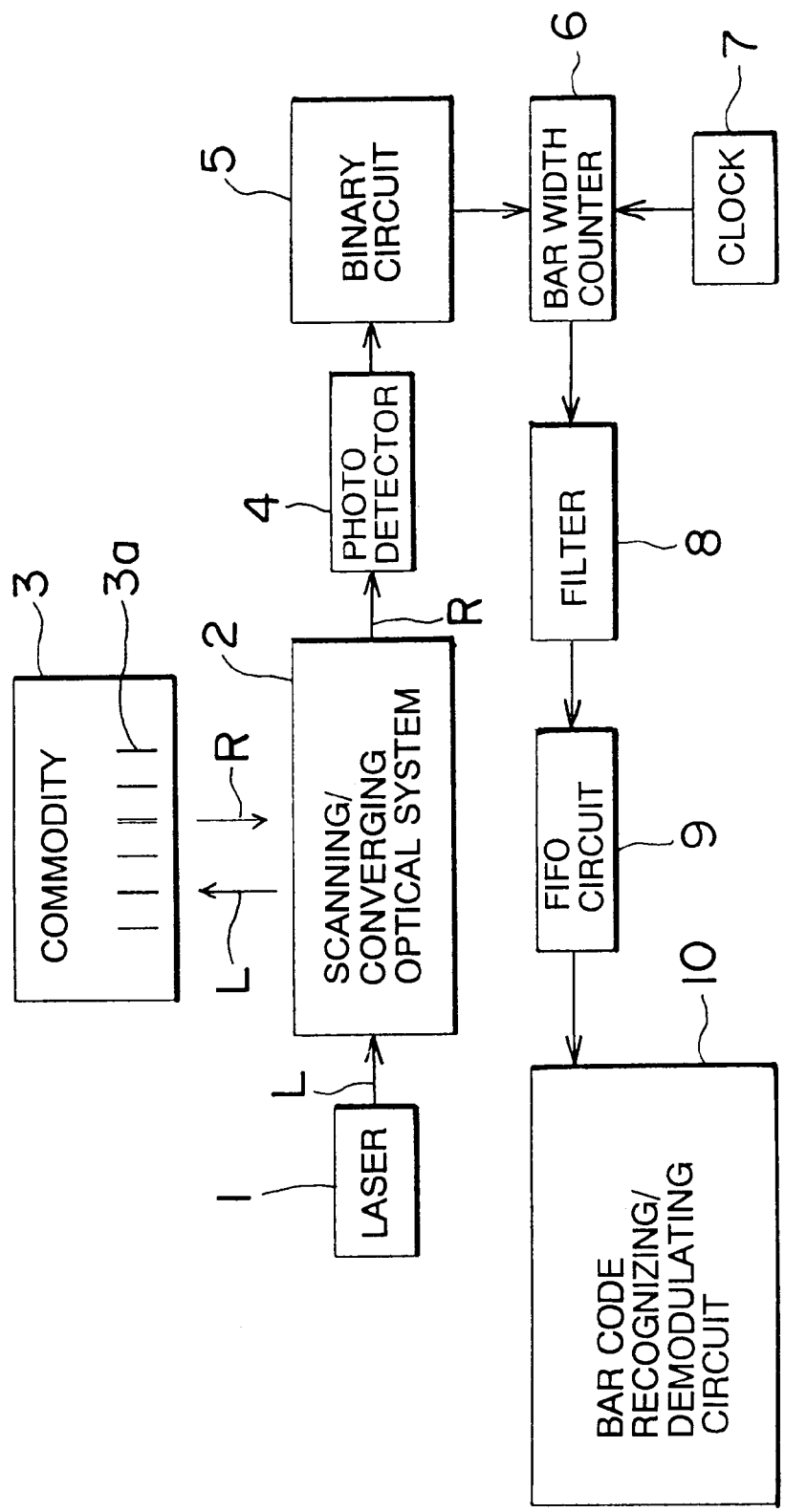
FIG. 2 is a block diagram illustrating a bar code reader in a first embodiment of the present invention.

FIG. 2 is a block diagram schematically illustrating a construction of a bar code detecting apparatus in the first embodiment of the present invention. Referring to FIG. 2, a laser light source 1 is a semiconductor laser for emitting laser beams L. The laser beams L emitted from this laser light source 1 are made incident on a scan/converging optical system 2. This scan/converging optical system 2 is an optical system for deflecting the laser beams L by use of a polygon mirror and reflecting the thus deflected laser beams in a variety of directions by using a plurality of fixed mirrors. Through this scan/converging optical system 2, the laser beam scanning in the plurality of directions is consecutively performed at a high speed upwardly of this scanning/converging optical system 2 within a deflection period on one reflecting surface of the polygon mirror (which is from the time when the laser beams start to be made incident on one reflecting surface till the time when the laser beams come off the same surface). That is, the laser light source 1 and the scanning/converging optical system 2 correspond to a light irradiating unit for irradiating the object surface with the scanned light beams. The thus scanned laser beams L, when striking on the surface of a commodity 3, are reflected and scattered from this surface, and some of the reflected beams R return to the scanning/converging optical system 2. The scanning/converging optical system 2 relays the reflected beams R to a photo detector 4. The photo detector 4 is a photo diode covered with a filter which transmits only the light beams having the same wavelength as the laser beams L (the reflected beams R) and inputs an electric current corresponding to intensity of the reflected beams R to a binary circuit 5. That is, the scanning/converging optical system 2 and the photo detector 4 correspond to a light receiving unit for photoelectrically converting the light beams reflected from the object surface.

The binary circuit 5 converts a value of the current input from the photo detector 4 into a value of voltage, compares the thus converted voltage value with a predetermined threshold value and shapes a waveform thereof into a square wave signal. This square wave signal indicates "H" if the intensity of the reflected light beam R corresponds to a reflectivity of a white bar of a bar code 3a on the commodity 3 but indicates "L" if the intensity of the reflected light beam R corresponding to a reflectivity of a black bar of the bar code 3a on the commodity 3. The binary circuit 5 detects respectively a rise (the white edge) and a fall (the black edge) of the square signal. The binary circuit 5 then outputs a white edge pulse (WEG) (the first signal status) in synchronization with the white edge and outputs a black edge pulse (BEG) (the second signal status). That is, this binary circuit 5 corresponds to a bright/dark pattern detecting unit.

A bar width counter 6 measures a time from a timing of the white edge pulse (WEG) to a timing of the black edge pulse (BEG) (which is expected to be the one corresponding to a width of the white bar of the bar code 3a) and a time from the timing of the black edge pulse (BEG) to the timing of the white edge pulse (WEG) (which is expected to be the one corresponding to a width of the black bar of the bar code 3a) on the basis of the white edge pulse (WEG) and the black edge pulse (BEG) that are input from the binary circuit 5. Note that the bar width counter 6 counts the number of clocks given from a clock 7 in order to measure times corresponding to those bar widths and outputs count values corresponding to those bar widths. That is, the bar width counter 6 corresponds to a numerical converting unit for sequentially converting, into numerical values, the widths of the respective bright and dark bars constituting the bright/dark pattern detected by the bright/dark pattern detecting unit.

A filter circuit 8 logically investigates each count value input from the bar width counter 6, eliminates the count value indicating a variation in intensity due to a factor exclusive of the reflected light beams R from the bar code 3a, extracts only the one exhibiting such a probability that it is a count value indicating each bar width of the bar code 3a and then transfers it to the next stage.

A FIFO memory circuit 9 is a first-in first-out (FIFO) memory for temporarily holding the count values passing through the filter circuit 8 and outputting the count values by order of the holding and also functions as a buffer.

A bar code recognizing/demodulating circuit 10 is a processor for executing a predetermined recognition/demodulation program with respect to the respective count values read from the FIFO memory circuit 9 and decoding various items of data encoded into bar codes. That is, the bar code recognizing/demodulating circuit 10 corresponds to a data demodulating unit for demodulating the data on the basis of the numerical values extracted by the extracting unit.

Next is a greater detailed explanation of the configurations of the bar width counter 6, the filter circuit 8, the FIFO memory circuit 9 and the bar code recognizing/demodulating circuit 10 among those components.

Bar Width Counter

Figure 3:
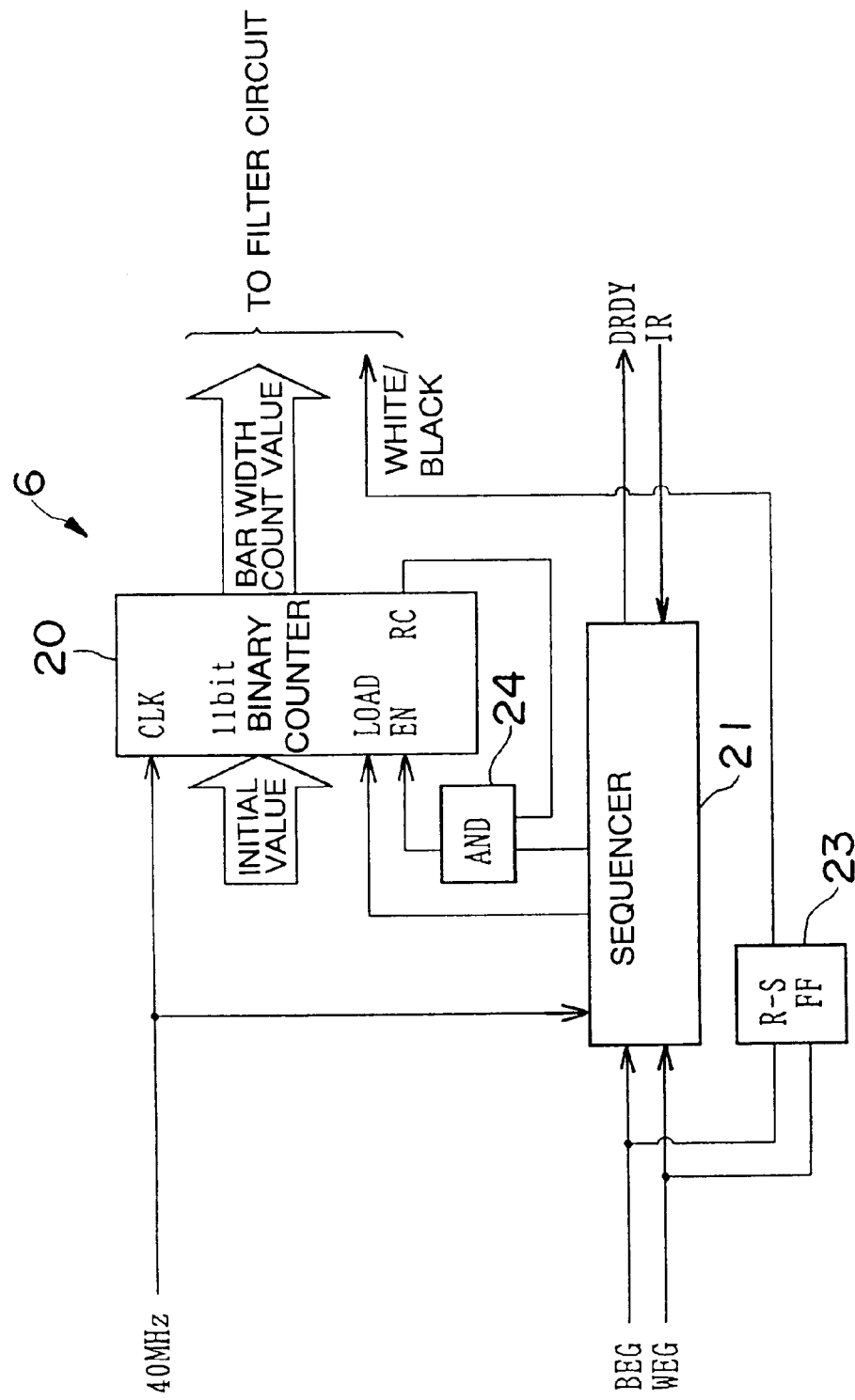
FIG. 3 is a block diagram showing a detailed configuration of a bar width counter of FIG. 2.

FIG. 3 is a block diagram illustrating the configuration of the bar width counter 6 in detail. As illustrated in FIG. 3, the white edge pulse (WEG) and the black edge pulse (BEG), that are input from the binary circuit 5, are input to a sequencer 21 and an R-S flip-flop 23, respectively. 40 MHz clock signals input from the clock circuit 7 are input to a binary counter 20 and the sequencer 21.

The R-S flip-flop 23 outputs a signal "1" implying the "white" when the white edge pulse (WEG) is input thereto and, outputs a signal "0" implying the "black" when the black edge pulse (BEG) is input thereto. An output (the color distinguishing signal) of this R-S flip-flop 23 is transmitted to the filter circuit 8.

The sequencer 21, when a color changing point comes, outputs a data ready signal (DRDY) to the filter circuit 8 and temporarily sets an enable signal to "0", which has been input to a terminal "EN" of the binary counter 20 via an AND gate 24. This color changing point involves a point of time when receiving the black edge pulse (BEG) immediately after receiving the white edge pulse (WEG) and a point of time when receiving the white edge pulse (WEG) immediately after receiving the black edge pulse (BEG). Accordingly, the sequencer 21, in the case of consecutively receiving the white edge pulses (WEG) or the black edge pulses (BEG), treats only the first pulse as a color changing point but ignores those after the first one. On the other hand, the sequencer 21, when receiving an input ready signal (IR) indicating a completion of a data write (a completion of preparation for writing the next data) from the FIFO memory circuit 9, inputs a load indicating signal (pulse) to a terminal "LOAD" of the binary counter 20 and sets the enable signal to "1".

The binary counter 20 defined as a 11-bit binary counter counts the pulses received from a terminal "CLK" during a period when the enable signal input to a terminal "EN" is "1" and outputs the counted number as a bar width count value to the filter circuit 8. This binary counter 20, when the enable signal becomes "0", stops counting the pulses.

Note that the sequencer 21 does not set the enable signal to "1" until the sequencer 21 receives the input ready signal (IR) from the FIFO memory circuit 9 even if the color changing point comes, and therefore the counting process by the binary counter 20 remains stopped during a time lag thereof. However, the time lag between when the color changing point has come and when the input ready signal (IR) is input, i.e., when the enable signal is set to "1". Hence, if the load indicating signal is input to the terminal "LOAD" simultaneously when the enable signal becomes "1", the binary counter 20 sets, as an initial value of the counted number, the count value corresponding to that time lag. Then, the count-up process is performed based on the set initial value till the enable signal becomes "0". As a result, the bar width count value correctly indicates a time from the color changing point. The bar width count value output before the setting of the initial value is overwritten by the initial value.

Moreover, if the laser beams L are not reflected at all, or if reflected from a surface other than the bar code 3a, there may be a possibility in which the time spanning from the color changing point to the next color changing point exceeds a time which can be measured in 11 bits. Therefore, the binary counter 20 is so constructed that when the bar width count value reaches a maximum 11-bit count value ($2^{12}-1$), a ripple carry-out signal output from a terminal "RC" thereof becomes "0". When the ripple carry-out signal becomes "0", the AND gate 24 closes. Hence, the signal input to the terminal "EN" of the binary counter 20 becomes "0", and the binary counter 20 stops counting.

As discussed above, the bar width counter 6 transmits the bar width count value, the color distinguishing signal and the data ready signal to the filter circuit 8.

Filter Circuit

Figure 4:
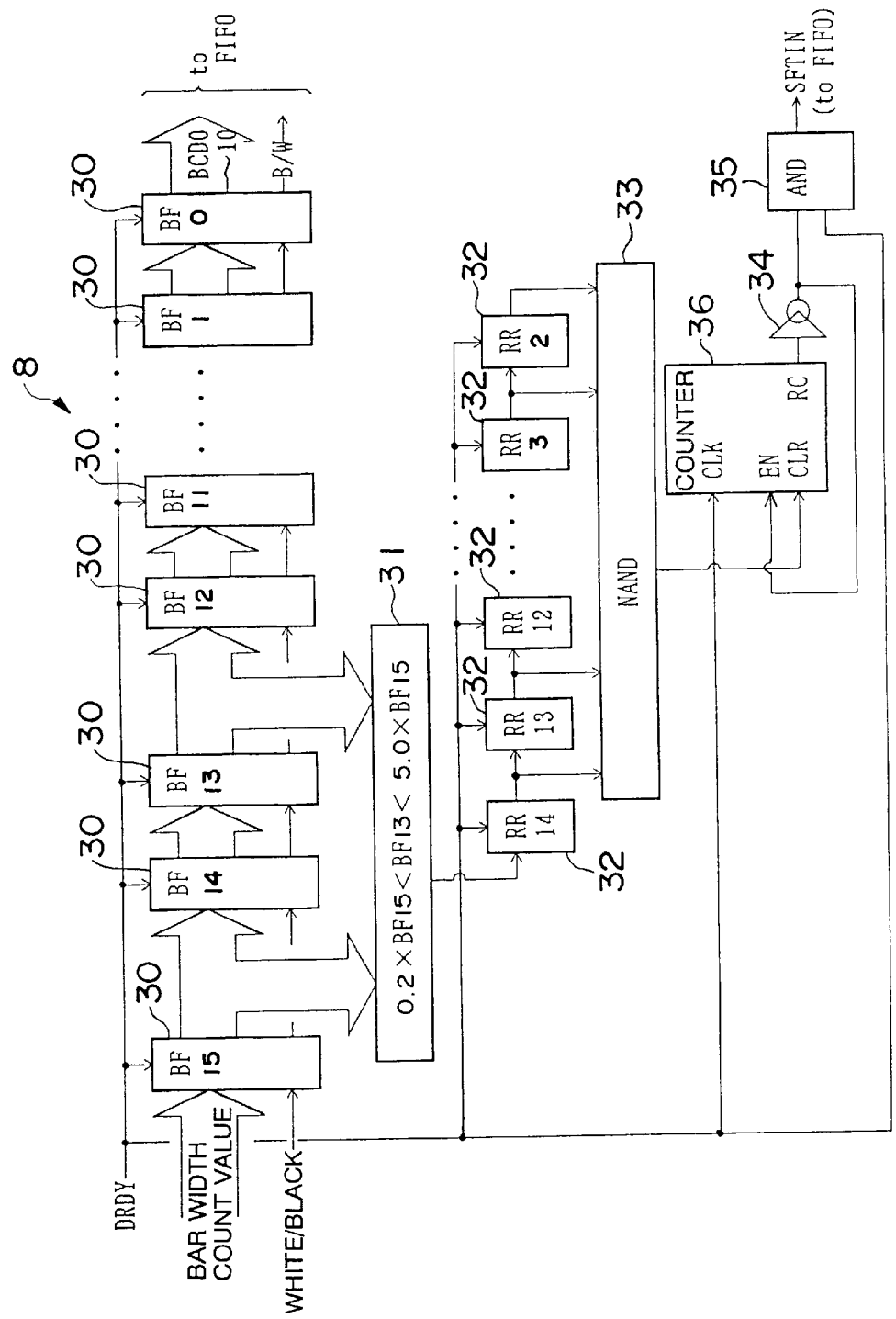
FIG. 4 is a block diagram showing a detailed configuration of a filter circuit of FIG. 2.

FIG. 4 is a block diagram illustrating a configuration of the filter circuit 8 in detail. As shown in FIG. 4, the bar width count value and the color distinguishing signal that are input from the bar width counter 20 are written to a buffer "BF15". A series of buffers "BF15"–"BF0" 30 connected each other in series at 16 stages are headed by that buffer "BF15". Input to those buffers 30 are the data ready signals (DRDY) from the sequencer 21 of the bar width counter 6. Then, every time the data ready signal (DRDY) is received, each buffer 30 holds the bar width count value and the color discriminating signal output from the sequencer 21 or the buffer 30 of an advance stage at that time. That is, the respective buffers "BF15"–"BF0" function as a 12-bit parallel shift register constructed of 16 stages as a whole. Accordingly, the bar width count value and the color discriminating signal written to the buffer "BF15" are, when the data ready signal (DRDY) is generated 16 times, output to the FIFO memory circuit 9 from the end buffer BF0".

Outputs of the buffers "BF15" and "BF13" among those buffers 30 are input also to comparing circuit 31. This comparing circuit 31 is a circuit for checking whether or not the bar width count value newly input to the buffer "BF15" meets such a predetermined bar code standard condition as to fall within a range that is 0.2–5.0 times as large as the bar width count value (the output of the buffer "BF13") input two times before. The reason why the outputs of the buffers "BF15" and "BF13" are compared is that those outputs indicates the widths of the bars assumed as the same color. Further, the reason why the range is set 0.2–5.0 times is that one character in the bar code is expressed by a 7-module of unit widths and that two black bars and two white bars have to be formed within the seven modules by allocating the respective modules to the white and the black according to the JAN and UPC code rules. Namely, according to the above rules, the minimum bar width is 1 module, while a maximum bar width is 4 modules. Therefore, a ratio thereof is 1:4 at the maximum, and hence there is no such possibility that the output of the buffer "BF15" exceeds the range of 0.2–5.0 times as large as the output of the buffer "BF13". If over this range, it can be considered to be attributed to a factor exclusive of the bar code. The output of the comparing circuit 31 becomes "1" if the output of the buffer "BF15" falls within the range of 0.2–5.0 times as large as the output of the buffer "BF13" but becomes "0" if beyond the range.

The output signal from the comparing circuit 31 is input to a result register "RR14". A series of result registers "RR14"–"RR2" 32 connected to each other in series at 13 stages are headed by that result register "RR14". Input to those result registers 32 are the data ready signals (DRDY) from the sequencer 21 of the bar width counter 6. Then, every time the data ready signal (DRDY) is received, each result register 32 holds a compared result (1/0) of the comparator 31 that is output from the comparator 31 or the result register 32 of an advance stage at that time. In short, the respective result registers "RR14"–"RR2" function as a 13-stage shift register as a whole. As a consequence, those result registers 32 are recorded with the results (H/L) of the comparisons effected 13 times in the past by the comparing circuit 31. In other words, the result registers 32 are recorded with the compared results with respect to the outputs of the buffers "BF15"–"BF1" at the present time. Accordingly, if all the outputs of those result registers "RR14"–"RR2" are "1", it follows that a series of 15 bar width count values are mutually arranged within the range of 0.2–5.0 times, and that the probability, wherein the bar width count values are obtained from the series of 15 bars of JPC or UPC code (the bar code consisting of consecutively alternately arranged white and black bars) can be decided as extremely high.

Then, the outputs of the result registers "RR14"–"RR2" are input to a NAND circuit 33, and (an inverted value of) a logical product thereof is output. If the output of the NAND circuit 33 is "0", this implies a high probability that the bar width count values held by the respective buffers are obtained from the bar code. If the output thereof is "1", this implies a low probability that the bar width count values are obtained from the bar code. Namely, the series of buffers 30, the comparing circuit 31, the series of result registers 32 and the NAND circuit 33 constitutes a determining unit.

The output signal of this NAND circuit 33 is input as a clear signal to a terminal "CLR" of the counter 36. The data ready signals (DRDY) from the sequencer 21 of the bar width counter 6 are input to a terminal "CLK" of the counter 36 instead of clocks. Also, a signal of a logical value "0" is always output from a terminal "RC" of the counter 36. The output of this terminal "RC" is inverted by an inverter 34 and input as a control signal to an AND gate 35 as well as being input as an enable signal to a terminal "EN" of the counter 36.

Then, the counter 36 receives the number of pulses of the data ready signals (DRDY) during such a period that the signal status of the enable signal input to the terminal "EN" is "1" and that the signal status of the clear signal input to the terminal "CLR" is "1" and then counts up a count value therein. When the clear signal input to the terminal "CLR" becomes "0", that count value is reset. When the count value reaches "17", the counter 36 outputs a signal of the logical value "1", that is, ripple carry-out signal from the terminal "RC". Accordingly, when this ripple carry-out signal is output, the signal status of the enable signal becomes "0". Hence, the counter 36 stops counting, and the AND gate 35 is closed. Note that the counter 36 is reset just when the output signal of the NAND circuit 33 again becomes "0". Then, the logical value of the signal output from the terminal "RC" becomes "0", and the AND gate 35 is opened again.

The AND gate 35 incorporates a function to permit or inhibit a passage of the data ready signal (DRDY) from the sequencer 21 of the bar width counter 6. An output passing through the AND gate 35 is input as a SIFTIN signal to the FIFO memory circuit 9. Then, this SIFTIN signal (DRDY signal) is input, whereby the FIFO memory circuit 9 of the next stage reads signals (the bar width count value and the color discriminating signal or a stack signal when the bar width count value and the color discriminating signal are not yet held by the buffer "BF0") output from the buffer "BF0". Specifically, if all the outputs of the result registers "RR14"–"RR2" are "1" (an output of NAND circuit 33 is "0"), and if there increases the probability that the bar width count values held by the buffers "BF15"–"BF1" are obtained from the bar code, the AND gate 35 opens, and the SIFTIN signal (DRDY signal) is input to the FIFO memory circuit 9. Hence, the FIFO memory circuit 9 reads the bar width count values output consecutively from the buffer "BF0". Accordingly, the counter 36, the inverter 34 and the AND gate 35 correspond to an extracting unit for extracting the numerical value determined by the determining unit as the one meeting the predetermined bar code standard condition. In particular, the extracting unit extracts the numerical values of subject and reference in a plurality of determinations only when the determination of it satisfying the bar code standard condition is made consecutively plural number of times by the determining unit.

Note that the signals (the bar width count value and the color discriminating signal, or the stack signal) held by the buffer "BF0" are not absolutely involved in the determination by the NAND circuit 33 in this case. Accordingly, there is certainly no such assurance that those signals (the numerical values just anterior to the numerical values to be determined or compared in that plurality of determinations) are obtained from the bar code 3a. The reason why the FIFO memory circuit 9 is made to read such signals lies in a possibility wherein those signals are based on margins (the white bars) each formed for one character on both sides of the bar code 3a.

After the output of the NAND circuit 33 has become temporarily "0",(even if the bar width count value exceeding the range of 0.2–5.0 times as large as the output of the buffer "BF13" is held by the buffer "BF15" and therefore the output of the NAND circuit 33 returns to "1") the bar width count value and the color discriminating data that are held by the respective buffers 30 are sequentially shifted between the individual buffers 30 and output from the buffer "BF0" toward the FIFO memory circuit 9 in synchronization with receiving the data ready signals (DRDY) till a total sum of the data ready signals (DRDY) received thereafter, including the data ready signal (DRDY) at that moment, becomes 16.

Accordingly, the bar width count value and the color discriminating data with the high probability of being obtained from the bar code, which have been held by the buffer "BF14" just when the output of the NAND circuit 33 returns to "1", are certainly output from the buffer "BF0" and read by the FIFO memory circuit 9 before the total sum of the data ready signals (DRDY) becomes 17. In addition, the bar width count value and the color discriminating data that have been held by the buffer "BF15" and that is a direct cause for the output of the NAND circuit 33 becoming "1" are output from the buffer "BF0" and read by the FIFO memory circuit 9 immediately before the total sum of the data ready signals (DRDY) becomes 17. The reason why the FIFO memory circuit 9 is made to read such signals (the numerical values just posterior to the numerical values to be determined or compared in that plurality of determinations) lies in a possibility wherein those signals are, as explained above, based on the margins.

Note that the bar width count value and the color discriminating data written thereafter to the buffer "BF15" are ready by the FIFO memory circuit 9 if the output of the NAND circuit 33 again becomes "0" till the above count value and data are output from the buffer "BF0", but are discarded without being read by the FIFO memory circuit 9 if the output remains "1".

Figure 5:
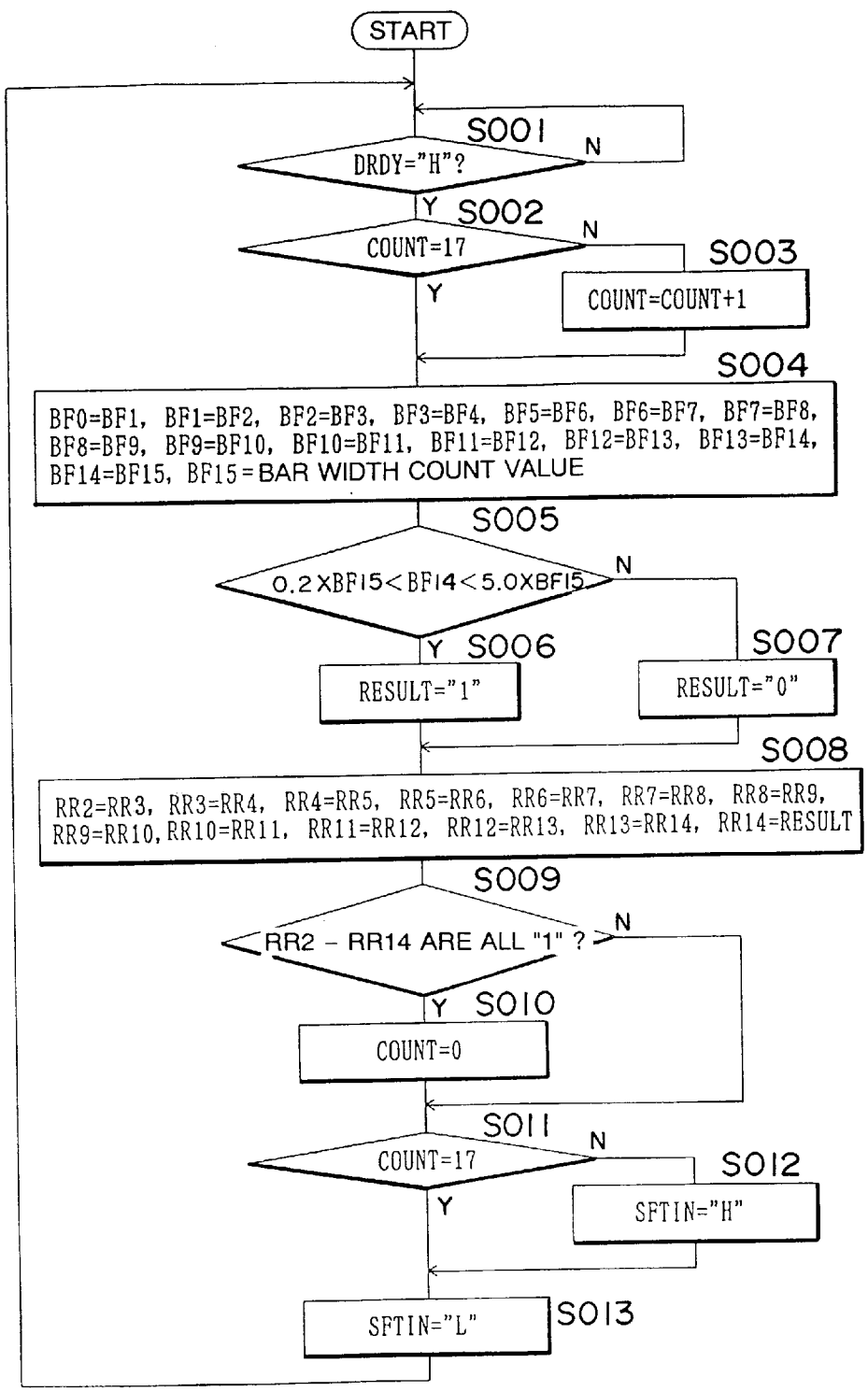
FIG. 5 is a flowchart showing a program equivalent to the filter circuit of FIG. 2.

The filter circuit 8 described above can be also replaced with a processor for executing a filtering program corresponding to the algorithm actualized therein. FIG. 5 is a flowchart showing such a filtering program. This program is started by switching ON a main power supply of a bar code reader. Then, in first step S001, there is a wait for inputting the data ready signal (DRDY="H") from the sequencer 21 of the bar width counter 6. Then, if input, in the next step S002, whether or not a count value (corresponding to the count value of the counter 36) reaches "17" is checked. If it reaches "17", the processing proceeds directly to step S004. If not "17", the count value is incremented by "1" in step S003, and thereafter the processing proceeds to step S004.

In step S004, variables (BF0–BF15) corresponding the respective buffers 30 are rewritten. That is, the bar width count value read from the binary counter 20 of the bar width counter 6 is substituted into a variable BF15, and the value that was previously substituted into the variable BF15 is shifted to a variable BF14. Hereinafter, similarly the values substituted into the respective variables are to be shifted in such a sequence as BF14→BF13→ . . . BF1→BF0. Note that a value of the variable BF0 becomes an output of that processor.

Checked in step S005 is whether or not the values of the variables BF15, BF13 at the present time satisfy the following relational expression.

$$0.2 \times BF15 < BF14 < 5.0 \times BF15$$

This check is a process corresponding to the comparing circuit 31. Then, if the above relational expression is satisfied, a variable RESULT is set to "1" in step S006. If not satisfied, the variable RESULT is set to "0" in step S007.

In any case, the variables (RR2–RR14) corresponding to the respective result registers 32 are rewritten in step S008. More specifically, the value of the variable RESULT that was set in step S006 or S007 is substituted into the variable RR14, and the value previously substituted into the variable RR14 is shifted to the variable RR13. Hereinafter, similarly, the values substituted into the respective variables are shifted in such a sequence as RR13→RR12→ . . . RR3→RR2.

Checked in step S009 is whether or not all the values of the variables RR2 through RR14 at the present time are "1". This check is a process corresponding to the NAND circuit 33. Then, if all the values of the variables RR2 through RR14 are "1", the count value is reset to "0" in step S010, and the processing proceeds to step S011. If all the values of the variables RR2 through RR14 are not "1", the processing proceeds directly to step S011.

Rechecked in step S011 is whether or not the count value is "17". This check is a process corresponding to the counter 36. Then, if the count value is not "17", the SIFTIN signal to the FIFO memory circuit 9 is temporarily set at "H" in step S012 and thereafter set at "L" in step S013. Resultingly, one pulse is output. If the count value is "17", the SIFTIN signal remains at "L" in step S013.

After the above processing, the processing is returned to step S001 in order to read the next bar width count value.

Then, the above loop processing is repeated till the main power supply of the bar code reader is switched OFF.

FIFO Memory Circuit

Figure 6:
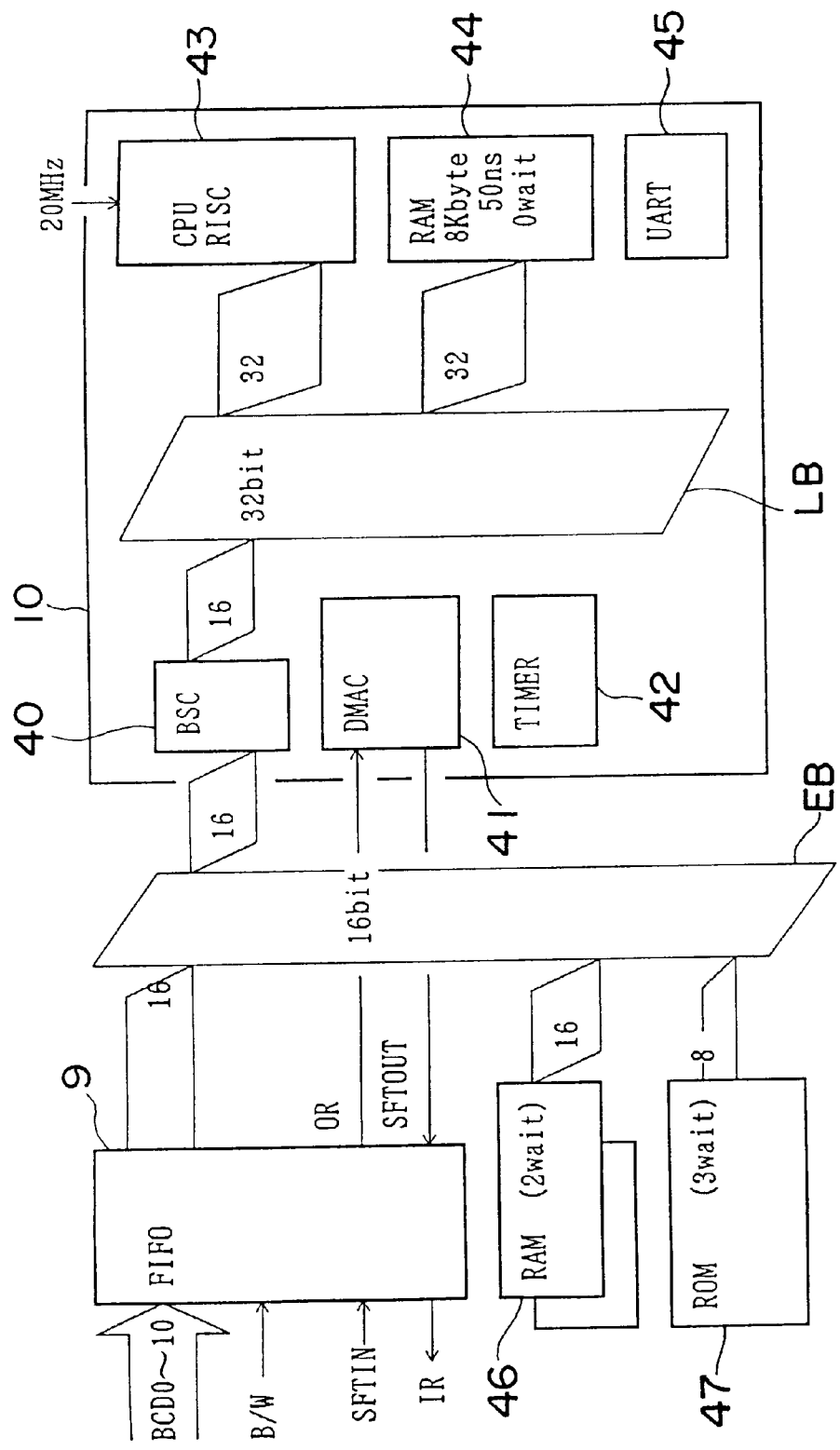
FIG. 6 is a block diagram illustrating detailed configurations of a FIFO memory circuit and of a bar code recognizing/demodulating circuit of FIG. 2.

FIG. 6 shows I/O signals of the FIFO memory circuit 9. Referring to FIG. 6, "BCD0–BCD10" designate signals indicating the bar width count values among the outputs of the buffer "BF0" of the filter circuit 8. Further, "B/W" denotes a color discriminating signal among the outputs of the buffer "BF0" of the filter circuit 8. Those signals are read by the FIFO memory circuit 9 when the SIFTIN signal (DRDY signal) is transmitted from the AND gate 35 of the filter circuit 8. Further, the FIFO memory circuit 9, when reading those signals, transmits the input ready signal (IR) to the sequencer 21 of the bar width counter 6.

This FIFO memory circuit 9 is connected via an external 16-bit bus EB to the bar code recognizing/demodulating circuit 10 of the next stage. The FIFO memory circuit 9 outputs the bar width count value and the color discriminating signal that were read first to the bar code recognizing/demodulating circuit 10 via the external bus EB and then transmits a signal (OR) for indicating that these items of data be taken into the bar code recognizing/demodulating circuit 10. Then, the bar code recognizing/demodulating circuit 10 notifies the FIFO memory circuit 9 of a signal (SETOUT) indicating a completion of the take-in of those signals, and, hereupon, the FIFO memory circuit 9 outputs the next bar width count value and color discriminating signal to the bar code recognizing/demodulating circuit 10.

Note that an external RAM 46 and an external ROM 47 are further connected to the external bus EB for connecting the FIFO memory circuit 9 to the bar code recognizing/demodulating circuit 10.

Bar Code Recognizing/Demodulating Circuit

Next, a configuration of the bar code recognizing/demodulating circuit 10 will be explained in greater detail.

This bar code recognizing/demodulating circuit 10 is constructed of a CPU 43, a RAM 44, a universal asynchronous receiver/transmitter (UART) 45, a direct memory access controller (DMAC) 41 and a timer 42 that are individually connected via a 32-bit local bus LB, and a bus state controller (BSC) 40 connected between the local bus LB and the external bus EB.

The CPU 43 composed of RSC chips controls the whole bar coder recognizing/demodulating circuit 10 and executes the bar code recognizing/demodulating process based on the bar width count value and the color discriminating signal that were transmitted from the FIFO memory circuit 9.

The bus state controller (BSC) 40 is an I/O interface for managing states of the local bus LB and the external bus EB.

The direct memory access controller (DMAC) 41, upon receiving the signal (OR) indicating that the signal be taken in from the FIFO memory circuit 9, controls the bus state controller 40 so as to transfer the bar width count value and the color discriminating signal that are transmitted from the FIFO memory circuit 9. With a completion of this transfer, the direct memory access controller (DMAC) 41 notifies the FIFO memory circuit 9 of the signal (SETOUT) indicating a completion of the take-in of the signal.

The timer 42 is a device for generating time data used for a variety of processes within the bar code recognizing/demodulating circuit 10.

The universal asynchronous receiver/transmitter (UART) 45 is a parallel/serial interface for converting character data demodulated as an item of parallel data into serial signals and outputting outside the serial signals through an unillustrated RS-232C port.

Figure 7:
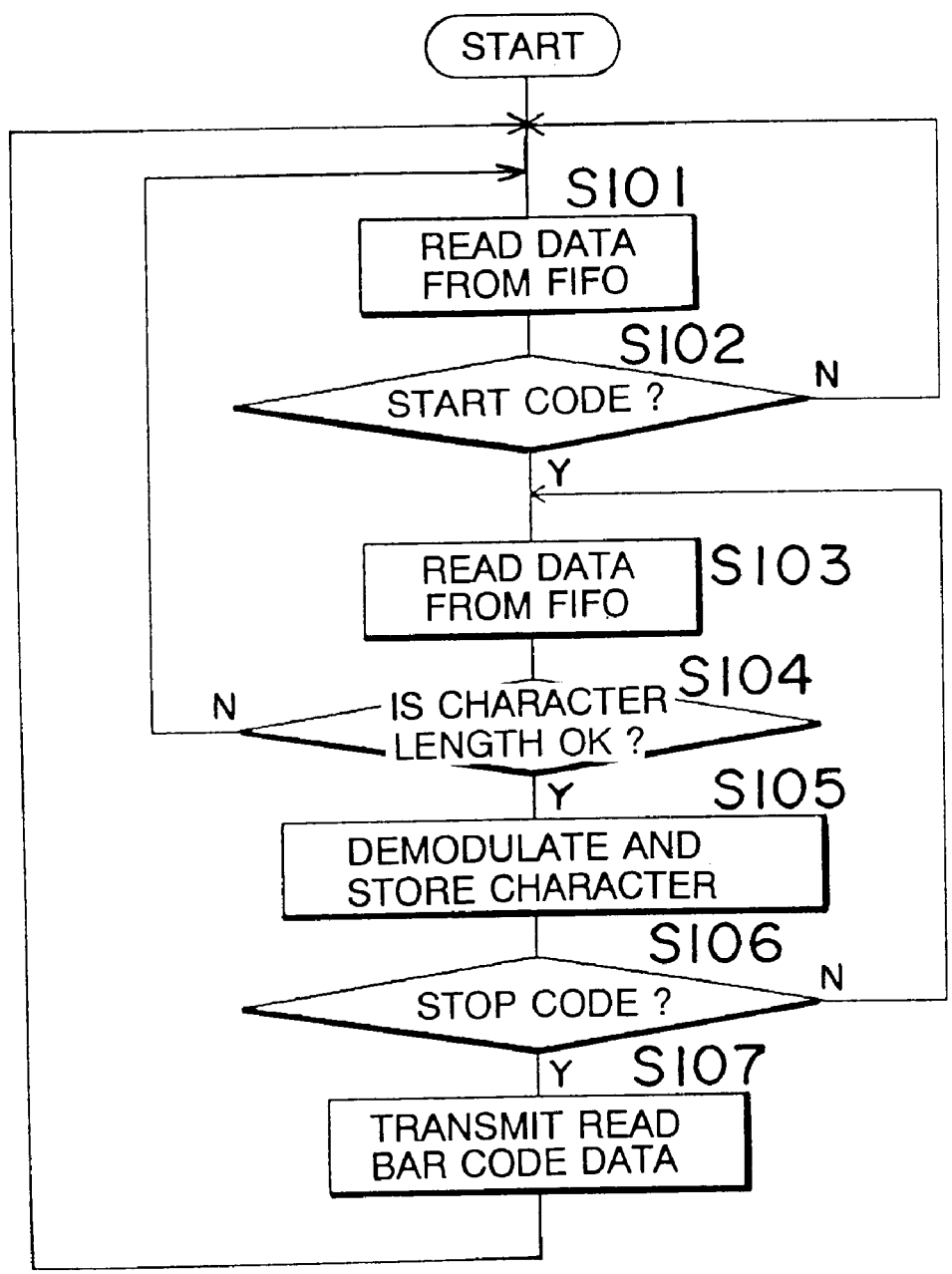
FIG. 7 is a flowchart showing a bar code recognizing/demodulating process executed by a CPU of FIG. 6.

Next, a content of the bar coder recognition/demodulation processing program executed by the CPU 43 will be explained with reference to a flowchart of FIG. 7. Referring to the flowchart of FIG. 7, the processing starts with switching ON the main power supply of the bar coder reader. Then, in first step S101, the CPU 43 reads one set of data (the bar width count value and the color discriminating data) from the FIFO memory circuit 9. In step S102, the CPU 43 checks whether or not the data read in step S101 and the data read several times in the past correspond to a start code. Note that the bar width count value read from the FIFO memory circuit 9 might extend as a whole depending on the scanning direction of the laser beam L along the bar code 3a. Accordingly, the CPU 43, when performing this check, normalizes the bar width count value on the basis of a predetermined fiducial value. As a result of this check, if the data read in step S101 and the data read several times in the past do not correspond to the start code, the CPU 43 returns the processing to step S101. If the above data correspond to the start code, the CPU 43 reads the data (the bar width count value and the color discriminating data) for one character (four pieces of bar width count values and color discriminating data corresponding to the two white bars and the two black bars) from the FIFO memory circuit 9 in step S103.

Checked in step S104 is a length of one-character data read in step S103. More specifically, if the one-character data is not seven modules, this implies that some error is caused or that step S102 is passed because the bar width count value based on something other than the bar code 3a takes the same pattern as the start code by chance, and therefore the processing returns to step S101. If the one-character data is the seven modules, this piece of data is recognized to be the bar width count value based on the bar code 3a. Hence, in step S105, the one-character data is converted into a character corresponding to that pattern, and the RAM 44 is stored with the thus converted character.

Checked in step S106 is whether or not the data read in step S103 corresponds to stop code. Then, if not the stop code, the processing is returned to step S103. If the read data is the stop code, the characters stored in the RAM 44 are transmitted to the outside via the universal asynchronous receiver/transmitter (UART) 45 in step S107. Then, the processing is returned to step S101 for demodulating the next bar code.

Next, the operation of the thus constructed first embodiment will be discussed by way of an example where specific numerical values are used.

Initial State

Now, it is assumed that the user switches ON the power supply of the bar code reader. Hereupon, the laser light source 1 starts to emit the laser beams L, and the scanning/converging optical system 2 has the laser beams L scanned in every direction. At this point in time, however, there is no commodity 3 to be scanned with the laser beams L, and hence the reflected light beams R are not received by the photo detector 4. Accordingly, the binary signal generated within the binary circuit 5 remains at the "L" level with no edge formed, and, therefore, nothing is output from this binary circuit 5.

Start of Scan over Surface of Commodity

Next, when the user turns the surface formed with the bar code 3a of the commodity 3 toward the scanning/converging optical system 2, this surface is scanned with the laser beams L.

Then, when the laser beams L strike on the white pattern on the surface of the commodity 3, the reflected light beams R are returned to the scanning/converging optical system 2 and received by the photo detector 4. Hereupon, the white edge pulse (WEG) is output from the binary circuit 5 and input to the sequencer 21 of the bar width counter 6. Then, this sequencer 21 outputs the single data ready signal (DRDY) to the filter circuit 8 in accordance with receiving this white edge pulse (WEG). Thereupon, the count value "0" of the binary counter 20 at the initial point of time is held by the buffer "BF15" of the filter circuit 8.

Note that all the values of all the buffers 30 and all the result registers 32 in the filter circuit 8 are "0" in the initial state. However, the count value of the counter 36 is "0", and, therefore, the AND gate 35 opens. Then, the FIFO memory circuit 9 is notified of the data ready signal (DRDY) as an SIFTIN signal. Then, the FIFO memory circuit 9 reads the output "0" of the buffer "BF0" in the filter circuit 8, and the sequencer 21 of the bar width counter 6 is notified of the input ready signal (IR) from the FIFO memory circuit 9. The sequencer 21 sets the initial value in the binary counter 20 and makes the same counter 20 start counting in accordance with that input ready signal (IR).

Next, when laser beams B strike on the black pattern on the surface of the commodity 3, a light quantity of the reflected light beams R incident on the photo detector 4 is smaller than a predetermined threshold value, and the black edge pulse (BEG) is output from the binary circuit 5 and input to the sequencer 21 of the bar width counter 6. Then, this sequencer 21 outputs the data ready signal (DRDY) toward the filter circuit 8 in accordance with receiving this black edge pulse (BEG). Hereupon, the count value "5" of the binary counter 20 at the present time is held by the buffer "BF15".

Note that the count value of the counter 36 becomes "1" at this point in time, and the AND gate 35 remains opened. Hence, the FIFO memory circuit 9 is notified of this data ready signal (DRDY) as an SIFTIN signal. Then the FIFO circuit 9 reads the output "0" of the buffer "BF0" in the filter circuit 8, and the sequencer 21 of the bar width counter 6 is notified of the input ready signal (IR) from the FIFO memory circuit 9. The sequencer 21 overwrites the count value of the binary counter 20 with the initial value in accordance with the input ready signal (IR) and makes the counter 20 resume counting.

Thus, the scanning over the surface of the commodity 3 is conducted, and it is assumed that the pattern of bar width count values such as "5"→"10"→"100"→"200"→"30" are repeatedly input six times to the filter circuit 8 from the bar width counter 6. If the pattern of those bar width count values is examined, "100" and "30", "30" and "10" fall within the range of 0.2–5.0 times, while "5" and "100", "10" and "200", "200" and "5" are beyond the range of 0.2–5.0 times. Accordingly, the results of comparisons of the comparing circuit 31 that are input to the result register "RR14" are like this: "0"→"0"→"0"→"0"→"1"→"0"→"1"→"0"→ "0"→"1"→"0"→"1"→"0"→"0"→"1"→"0"→"1"→"0"→ "0"→"1"→"0"→"1"→"0"→"0"→"1". Note that a continuity of "0" at the initial status implies a comparison of the input bar width count value with the initial set value "0".

If the results of comparison by the comparing circuit 31 are coincident with the above pattern, there is no such possibility that all the outputs of all the result registers 32 are "1", and hence the count value of the counter 36 continues to be incremented without being cleared. In consequence, when "5" at the fourth cycle is input to the filter circuit 8, the count value of the counter 36 becomes "16", and therefore the AND gate 35 remains opened. The data ("0"→"0"→"0"→"0"→"0"→"0"→"0"→"0"→"0"→"0"→ "0"→"0"→"0"→"0"→"0"→"5") output from the buffer "BF0" by that time are read by the FIFO memory circuit 9. When next "10" is input to the filter circuit 8, however, the count value of the counter 36 becomes "17", and therefore the AND gate 35 is closed. Then, the transmission of the SIFTIN signal to the FIFO memory circuit 9 is stopped. Accordingly, the bar width count values output thereafter from the buffer "BF0" are discarded without being read by the FIFO memory circuit 9.

Start of Scan over Bar Code

Next, the bar code 3a on the commodity 3 is scanned with the laser beams L, and it is assumed that the bar width count values are input to the filter circuit 8 in such a sequence as: "1000"→"101"→"112"→"103"→"104"→"205"→"306"→ "107"→"208"→"209"→"200"→"101"→"402"→"103"→ "104"→"105"→"1000". It is to be noted that "1000" indicates margins (the white bars) formed at the head and tail of the bar code 3a. Further, the fifteen pieces of bar width count values interposed between "1000" and "1000" are given by the reflected light beams R from the bar code 3. Hence, a ratio between each two of the bar width count values arranged at an interval of one falls in the range of 0.2–5.0 times.

If a pattern of bar width count values is continuously shifted within the respective buffers 30, and just when "105" is input the outputs of all the result registers 32 become "1", and the output of the NAND circuit 33 becomes "0". Namely, there are a series of 15 bars satisfying the bar code condition, which leads to such a determination that a probability of constituting the bar code is high. Accordingly, the count value of the counter 36 is cleared, and the output from the terminal "RC" becomes "0". Then, the AND gate 35 opens, and the SIFTIN signal is supplied to the FIFO memory circuit 9. At this point in time, the bar width count value output from the buffer "BF0" is "1000", and hence the bar count values including "1000" output thereafter are read by the FIFO memory circuit 9.

When "1000" is next input to the filter circuit 8, however, this "1000" is more than 5.0 times as large as "104" which is input two times before, so that "0" is written to the result register "RR14". Hereupon, the output of the NAND circuit 33 becomes "1", and the counter 36 is brought into a countable status. At this point in time, since the signal DRDY is simultaneously input, the count value becomes "1". Accordingly, the bar width count values output thereafter from the buffer "BF0" are read by the FIFO memory circuit 9 without being discarded till the count value becomes "16". Note that the bar width count value which is output from the buffer "BF0" at this time is "101".

Scan over Surface of Commodity

Upon a completion of the scanning along the bar code 3a, it follows that areas exclusive of the bar code 3a on the surface of the commodity 3 are scanned with the laser beams L. Herein, it is assumed that the bar width count values of such a pattern as "5"→"10"→"100"→"200"→"30" are repeatedly input to the filter circuit 8 in the same way as mentioned above.

As discussed above, when the bar width count values of such a pattern are input to the filter circuit 8, all the outputs of the all the result registers 32 never become "1". Accordingly, the counter 36 continues to increment the count value without clearing.

When the bar width count values with the repetitive pattern are input to the filter circuit, the bar width count values of the bars constituting the bar code that are held in the respective buffers 30 are sequentially shifted between the buffers 30 and then output from the buffer "BF0". Thus, the bar width count values output from the buffer "BF0" are read by the FIFO memory circuit 9 till the count value of the counter 36 becomes "16". Hence, the bar width count values of the bars constituting the bar code (and margins) are read by the FIFO memory circuit 9 in such a sequence as: "101"→"112"→"103"→"104"→"205"→"306"→"107"→"208"→"209"→"200"→"101"→"402"→"103"→"104"→"105"→"1000". Then, the bar width count values thereafter, i.e., those based on the pattern on the surface of the commodity are discarded without being read by the FIFO memory circuit 9 because the AND gate 35 is closed as a result of the count value of the counter 36 having become ×17" and the signal output from the terminal "RC" having become "1".

As clarified from the discussion given above, in accordance with this embodiment, the count value of the counter 36 does not reach "17" immediately after switching ON the main power supply of the bar coder reader, and, therefore, it may happen that the bar width count values (including the initial value of the buffer 30) of the bars constituting no bar code are read by the FIFO memory circuit 9. However, after the count value of the counter 36 has temporarily reached "17", the FIFO memory circuit 9 reads only a series of 15 pieces of bar width count values and the color discriminating data with a high probability of constituting the bar code and also the bar width count values and the color discriminating data exhibiting a high probability of constituting the margins added by ones to the head and tail thereof. Accordingly, the bar width count values and the color discriminating data to be processed by the bar code recognizing/demodulating circuit 10 are only those constituting the bar code and the margins as well. Empirically, a quantity of the data (the bar width count values and the color discriminating data) input to the bar code recognizing/demodulating circuit 10 could be reduced down to a half.

Hence, a processing efficiency of the bar code recognizing/demodulating circuit 10 is enhanced, and there is produced an allowance for increasing a scanning speed and for making the bar code recognizing/demodulating process complex.

Second Embodiment

In the first embodiment discussed above, the continuity of the data is lost by deleting the data exhibiting a low probability of constituting the bar code. This discontinuity is not seemingly seen, with the results that it can not be distinguished from the continuous data. As a consequence, there is produced such a possibility that the bar code recognizing/demodulating circuit 10 tends to erroneously read the data (that is, demodulating error). The second embodiment of the present invention is constructed in view of this problem and is characterized by setting a flag "ERR" indicating a discontinuity in the data just when the data continuity is lost.

Figure 8:
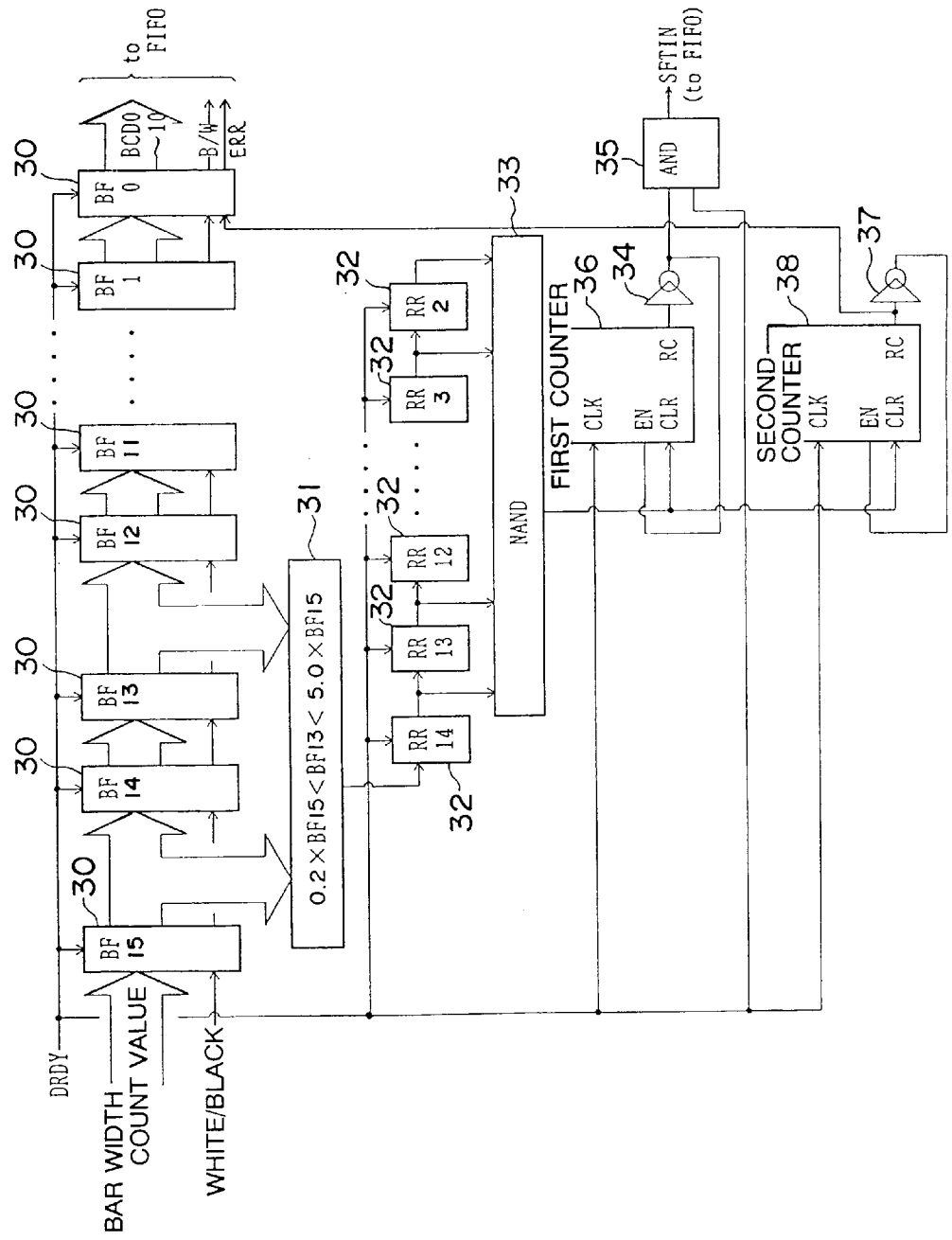
FIG. 8 is a block diagram showing a detailed configuration of the filter circuit of a bar code reader in a second embodiment of the present invention.

FIG. 8 is a block diagram illustrating a configuration of the filter circuit 8 in the second embodiment. As obvious from FIG. 8, the filter circuit 8 in the second embodiment is different from the filter circuit 8 in the first embodiment in terms of such an arrangement that absolutely the same second counter 38 as the counter 36 used in the first embodiment is provided in addition to the first counter 36, and a ripple carry-out signal output from the terminal "RC" of the second counter 38 is output as an error flag from the buffer "BF0". Other components in FIG. 8 are absolutely the same as those of the filter 8 in the first embodiment and are therefore marked with the same reference numbers with an omission of the explanation thereof.

In a second counter 38, as in the case of the first counter 36, the data ready signal (DRDY) is input to the terminal "CLK". the output of the NAND circuit 33 is input to the terminal "CLR" thereof, and the output of the terminal "RC" thereof is inverted by an inverter 37 and then input to the terminal "EN". Then, the second counter 38 performs the same operation as the first counter 36. The first counter 36, however, sets the ripple carry-out signal output from the terminal "RC" to "1" just when the count value becomes "17". Contrastingly, the second counter 38 sets the ripple carry-out signal output from the terminal "RC" to "1" just when the count value becomes "16".

On the other hand, the buffer "BF0" has a 13-bit parallel structure, while other buffers "BF1"–"BF15" have a 12-bit parallel structure. Then, the ripple carry-out signal output from the second counter 38 is written to the 13th bit of the buffer "BF0" and then output as the flag "ERR" indicting the data discontinuity to the FIFO memory circuit 9.

Based on the construction described above, it follows that the flag "ERR" is set in the data output from the buffer "BF0" just before the count value of the first counter 36 has become "17" and the AND gate 35 is closed. Accordingly, the flag "ERR" is set in the last data among pieces of continuous data to be read by the FIFO memory circuit 9. The bar code recognizing/demodulating circuit 10 is therefore capable of detecting a position where the data continuity is lost and executing the bar code recognizing/demodulating process without erroneously reading the data (the demodulating error).

Figure 9:
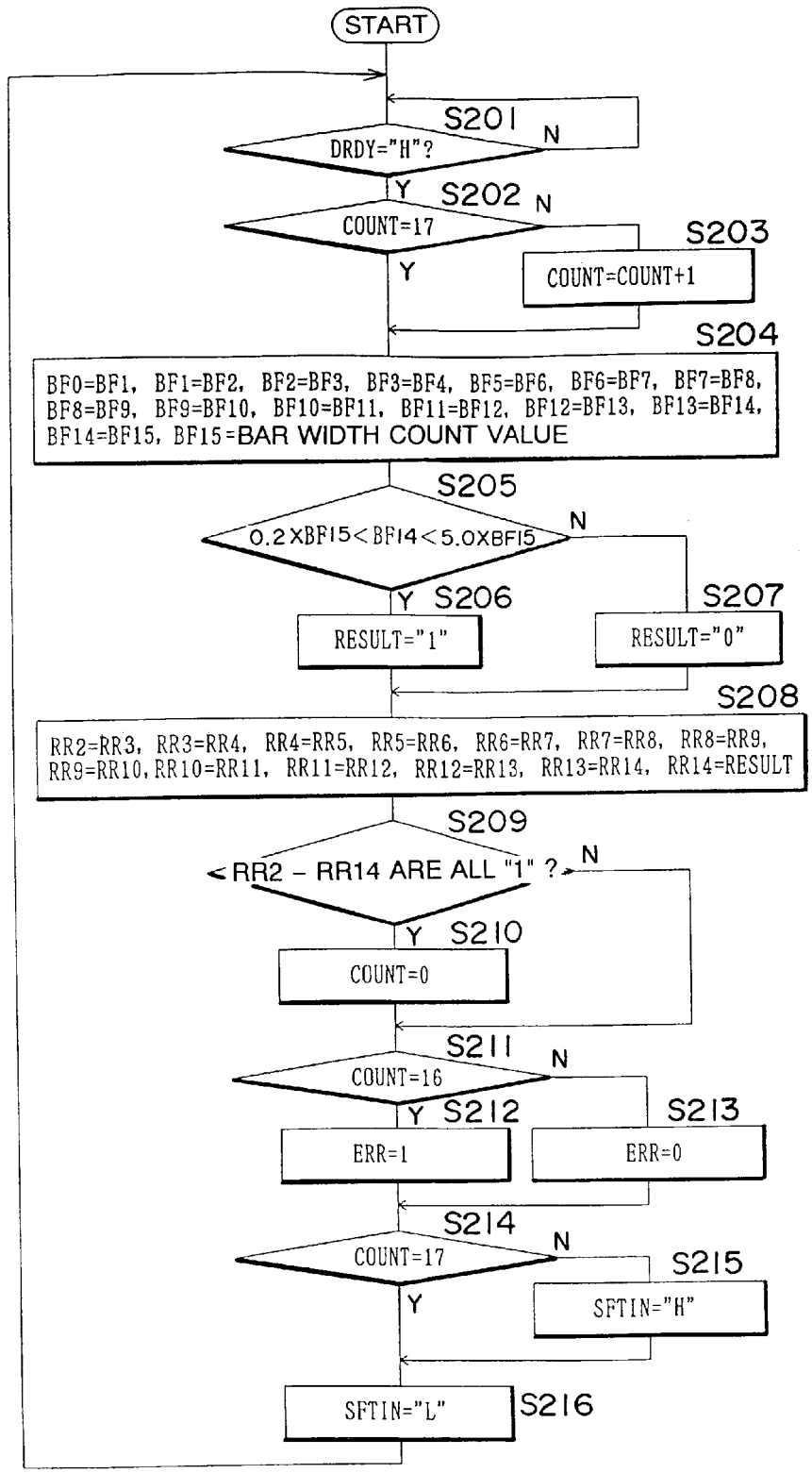
FIG. 9 is a flowchart showing a program equivalent to the filter circuit of FIG. 8.

It is also possible to replace the filter circuit 8 described above with a processor for executing a filtering program corresponding to the algorithm actualized therein. FIG. 9 is a flowchart showing such a filtering program. This program is started by switching ON the main power supply of the bar code reader. Then, in first step S201, there is a wait for inputting the data ready signal (DRDY) from the sequencer 21 of the bar width counter 6. Then, if input, in step S202, whether or not a count value (corresponding to the count value of the first counter 36) reaches "17" is checked. If it reaches "17", the processing proceeds directly to step S204. If not "17", the count value is incremented by "1" in step S203, and thereafter the processing proceeds to step S204.

In step S204, the variables (BF0–BF15) corresponding the respective buffers 30 are rewritten. That is, the bar width count value read from the binary counter 20 of the bar width counter 6 is substituted into the variable BF15, and the value that was previously substituted into the variable BFl5 is shifted to the variable BF14. Hereinafter, similarly the values substituted into the respective variables are shifted in such a sequence as BF14→BF13→ ... BF1→BF0. Checked in step S205 is whether or not the values of the variables BF15, BF13 at the present time satisfy the following relational expression.

$$0.2 \times BF15 < BF14 < 5.0 \times BF15$$

This check is a process corresponding to the comparing circuit 31. Then, if the above relational expression is satisfied, the variable RESULT is set to "1" in step S206. If not satisfied, the variable RESULT is set to "0" in step S207.

In any case, the variables (RR2–RR14) corresponding to the respective result registers 32 are rewritten in the next step S208. More specifically, the value of the variable RESULT that was set in step S206 or S207 is substituted into the variable RR14, and the value previously substituted into the variable RR14 is shifted to the variable RR13. Hereinafter, similarly the values substituted into the respective variables are shifted in such a sequence as RR13→RR12→ ... RR3→RR2.

Checked in step S209 is whether or not all the values of the variables RR2 through RR14 at the present time are "1". This check is a process corresponding to the NAND circuit 33. Then, if all the values of the variables RR2 through RR14 are "1", the count value is reset to "0" in step S210, and the processing proceeds to step S211. If all the values of the variables RR2 through RR14 are not "1", the processing proceeds directly to step S211.

Checked in step S211 is whether or not the count value is "16". This check is a process corresponding to the second counter 38. Then, if the count value is not "16", the flag "ERR" of the data to be output is set to "0" in step S213. If the count value is "16", the flag "ERR" of the data to be output is set to "1" in step S212.

In any case, whether or not the count value is "17" is checked in step S214. This check is a process corresponding to the first counter 36. Then, if the count value is not "17", the SIFTIN signal to the FIFO memory circuit 9 is temporarily set at "H" in step 215 and thereafter set at "L" in step S216. Resultingly, one pulse is output. If the count value is "17", the SIFTIN signal remains at "L" in step S216.

After the above processing, the processing is returned to step S201 in order to read the next bar width count value. Then, the above loop processing is repeated till the main power supply of the bar code reader is switched OFF.

Figure 10:
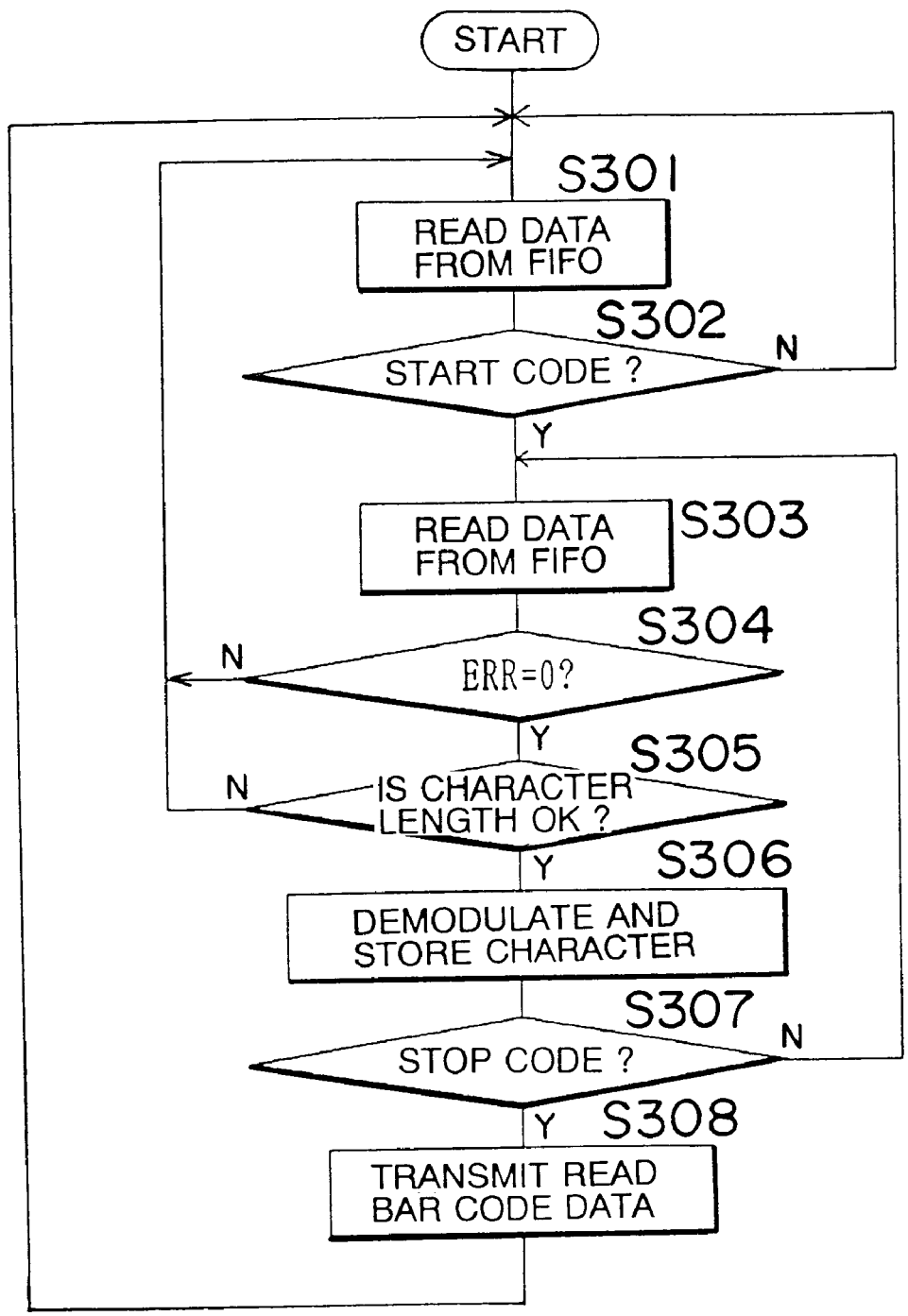
FIG. 10 is a flowchart showing the bar code recognizing/demodulating process executed by the CPU in a bar code recognizing/demodulating circuit of the bar code reader in the second embodiment of the present invention.

FIG. 10 is a flowchart showing a content of a bar coder recognition/demodulation processing program executed by the CPU 43 of the bar code recognizing/demodulating circuit 10.

The program in the flowchart of FIG. 10 is started by switching ON the main power supply of the bar code reader. Then, the CPU 43, in first step S301, reads one set of data (the bar width count value and the color discriminating data) from the FIFO memory circuit 9. In the next step S302, the CPU 43 checks whether or not the data read in step S301 and the data read several times in the past correspond to a start code. Note that the bar width count value read from the FIFO memory circuit 9 might extend as a whole depending on the scanning direction of the laser beam L along the bar code 3a. Accordingly, the CPU 43, when performing this check, normalizes the bar width count value on the basis of the predetermined fiducial value. As a result of this check, if the data read in step S301 and the data read several times in the past do not correspond to the start code, the processing is returned to step S301. If the above data correspond to the start code, the CPU 43 reads the data (the bar width count value and the color discriminating data) for one character (four pieces of bar width count values and color discriminating data corresponding to the two white bars and the two black bars) from the FIFO memory circuit 9 in step S303.

Checked in step S304 is whether or not the flag "ERR" added to the data read in step S303 is "0". If "ERR"="1", this piece of data is determined as the terminal of a string of continuous data (margin, etc.) which is not included in the data constituting the bar code 3a, and hence the CPU 43 returns the processing to step S301. If "ERR"="0", that piece of data exists in the middle of the continuous data, and therefore the CPU 43 proceeds the processing to step S305.

In step S305, the CPU 43 checks a length of one-character data read in step S303. More specifically, if the one-character data is not seven modules, this implies that some error is caused or that the bar width count values obtained from elements other than the bar code 3a take the same pattern as the start code by chance, and the CPU 43 therefore returns the processing to step S301. If the one-character data is the seven modules, this piece of data is recognized to be the bar width count value based on the bar code 3a. Hence, in step S306, the CPU 43 converts the one-character data into a character corresponding to that pattern, and the RAM 44 is stored with the thus converted character.

Checked in step S307 is whether or not the data read in step S303 corresponds to stop code. Then, if not the stop code, the processing is returned to step S303. If the read data is the stop code, the characters stored in the RAM 44 are transmitted to the outside via the universal asynchronous receiver/transmitter (UART) 45 in step S308. Then, the processing is returned to step S301 for demodulating the next bar code.

Other configurations and operations in the second embodiment are absolutely the same as those in the first embodiment, and hence the explanation thereof will be omitted.

According to the bar code detecting apparatus and the bar code detecting method of the thus constructed present invention, the reflected light data which is obviously decided as obtained from the elements exclusive of the bar code can be logically eliminated before being input to the demodulating circuit, thereby making it possible to enhance a containing rate of the bar code reflected light data in the reflected light data and a processing efficiency of the demodulating circuit.

This invention being thus described, it will be obvious that the same may be varied in the same way. Such variations are not to be regarded as a departure from the spirit and scope of the invention, and all such modification as would be obvious to one skilled in the art is intended to be included within the scope of the following claims.

We claim:

1. A bar code detecting apparatus comprising:

bright/dark pattern detecting means for scanning an object surface and detecting a bright/dark pattern on the object surface along a scan trajectory;

numerical value converting means for sequentially converting widths of the bright and dark portions of the bright/dark pattern detected by said bright/dark pattern detecting means into numerical values;

determining means, to which the respective numerical values converted by said numerical converting means are sequentially input, for determining whether or not each input numerical value meets a predetermined bar code standard condition with respect to the numerical value input just before it;

extracting means for extracting the numerical value so determined by said determining means only when the numerical value is continuously determined a plurality of times code by code to meet the predetermined bar code standard condition with respect to the numerical value input just before it, wherein numerical values having no possibility of being attributed to a pattern constituting the bright/dark pattern are not extracted; and data demodulating means for demodulating the data on the basis of the numerical value extracted by said extracting means, wherein only numerical values having a possibility of being attributed to the bright/dark pattern are demodulated.

2. A bar code detecting apparatus according to claim 1, wherein said bright/dark pattern detecting means includes:

light irradiating means for irradiating the object surface with scanning light beams;

photoelectrically converting means for photoelectrically converting a reflected light beams from the object surface; and signal converting means for converting an electric signal obtained by said photoelectrically converting means into a signal assuming a first signal status showing the bright portion and a second signal status showing the dark portion.

3. A bar code detecting apparatus according to claim 1, wherein said determining means determines whether or not the input numerical value, if it is a numerical value of the bright portion, satisfies the predetermined bar code standard condition with respect to the bright portion numerical value input just before it and determines whether or not the input numerical value, if it is a numerical value of the dark portion, satisfies the predetermined bar code standard condition with respect to the dark portion numerical value input just before it.

4. A bar code detecting apparatus according to claim 1, wherein said extracting means also extracts numerical values just before and after the numerical values which are determined or referred to in the plurality of determinations.

5. A bar code detecting apparatus according to claim 4, wherein said extracting means adds delimiter flags to the numerical values, indicating a discontinuity of the data, just after the numerical values which are determined or referred to in the plurality of determinations.

6. A bar code detecting method, the process comprising steps of:

scanning an object surface;

detecting a bright/dark pattern on the object surface along a scan trajectory;

sequentially converting widths of the bright and dark portions of the bright/dark pattern detected into numerical values;

determining whether or not the converted numerical value meets a predetermined bar code standard condition with respect to the numerical value converted just before it;

extracting the former converted numerical value only when the numerical value is continuously determined a plurality of times code by code to meet the predetermined bar code standard condition with respect to the numerical value converted just before it, wherein numerical values having no possibility of being attributed to a pattern constituting the bright/dark pattern are not extracted; and demodulating the data on the basis of the extracted numerical value, wherein only numerical values having a possibility of being attributed to the bright/dark pattern are demodulated.

7. A bar code detecting apparatus comprising:

bar code detecting means for scanning an object surface and for detecting a bar code including a character bar and a guard bar facing a margin on the object surface along a scan trajectory;

numerical value converting means for sequentially converting widths of the character bar and the guard bar detected by the bar code detecting means into numerical values;

determining means, to which the respective numerical values converted by the numerical value converting means are sequentially input, for determining whether or not each input numerical value meets a predetermined bar code standard condition with respect to the numerical value input just before it;

extracting means for extracting the numerical value determined by said determining means only when the numerical value is continuously determined a plurality of times code by code to meet the predetermined bar code standard condition with respect to numerical value input just before it, wherein numerical values having no possibility of being attributed to a pattern constituting the bar code are not extracted; and data demodulating means for demodulating the data based on the numerical value extracted by the extracting means, wherein only numerical values having a possibility of being attributed to the bar code are demodulated.

8. A bar code detecting apparatus according to claim 1, wherein the predetermined bar code standard condition is such a condition that the input numerical value falls within a range of 0.2–5.0 times as large as the numerical value input just before it.

* * * * *